(12) United States Patent
Langkabel et al.

(10) Patent No.: US 8,786,190 B2
(45) Date of Patent: Jul. 22, 2014

(54) LIGHTING DEVICE FOR VEHICLES

(75) Inventors: Frank Langkabel, Ruesselsheim (DE);
Joerg Kathmann, Salzkotten (DE);
Ingolf Schneider, Ruesselsheim (DE)

(73) Assignee: GM Global Technology Operations LLC, Detoit, MI (US)

(*) Notice: Subject to any disclaimer, the term of this patent is extended or adjusted under 35 U.S.C. 154(b) by 81 days.

(21) Appl. No.: 13/372,752

(22) Filed: Feb. 14, 2012

(65) Prior Publication Data

US 2012/0212133 A1 Aug. 23, 2012

(30) Foreign Application Priority Data

Feb. 18, 2011 (DE) .......................... 10 2011 011 699

(51) Int. Cl.
*B60Q 1/14* (2006.01)
(52) U.S. Cl.
USPC ............... 315/77; 315/82; 315/129; 315/132; 315/192
(58) Field of Classification Search
None
See application file for complete search history.

(56) References Cited

U.S. PATENT DOCUMENTS

| | | |
|---|---|---|
| 2003/0015973 A1 | 1/2003 | Ovens et al. |
| 2006/0082332 A1* | 4/2006 | Ito et al. .......................... 315/291 |
| 2010/0049454 A1* | 2/2010 | Irissou et al. ................... 702/58 |
| 2010/0176729 A2 | 7/2010 | Jones et al. |
| 2011/0210670 A1* | 9/2011 | Sauerlander et al. ......... 315/120 |

FOREIGN PATENT DOCUMENTS

| | | |
|---|---|---|
| DE | 3017277 A1 | 11/1981 |
| DE | 10044455 A1 | 4/2002 |
| DE | 102005036692 A1 | 2/2007 |
| DE | 102009006250 A1 | 10/2009 |
| EP | 1410949 A2 | 4/2004 |
| EP | 2050619 A2 | 4/2009 |
| JP | 2001083260 A | 3/2001 |
| WO | 2007048397 A1 | 5/2007 |
| WO | 2007066112 A1 | 6/2007 |

OTHER PUBLICATIONS

UK IPO, British Search Report for Application No. 1202599.5, dated Jun. 18, 2012.
German Patent Office, German Search Report for Application No. 102011011699.0, dated Dec. 19, 2011.

* cited by examiner

*Primary Examiner* — Anh Tran
(74) *Attorney, Agent, or Firm* — Ingrassia Fisher & Lorenz, P.C.

(57) ABSTRACT

A lighting device for vehicle lights is provided that includes, but is not limited to LEDs arranged in a combined parallel/series circuit. A first photodiode is used to recognize the lighting of a first LED and a second photodiode is provided to recognize the lighting of a second LED of the plurality of LEDs.

15 Claims, 5 Drawing Sheets

LIGHTING DEVICE FOR VEHICLES

CROSS-REFERENCE TO RELATED APPLICATION

This application claims priority to German Patent Application No. 10 2011 011 699.0, filed Feb. 18, 2011, which is incorporated herein by reference in its entirety.

TECHNICAL FIELD

The application relates to a lighting device for vehicles. Light-emitting diodes (LEDs) are increasingly being used in lighting devices for vehicles, in particular in taillights.

BACKGROUND

Individual LEDs are not installed in taillights, but rather panels, which each have a plurality of LEDs. The individual LEDs are typically interconnected either in a series circuit or in a combination parallel/series circuit. In the series circuit, anodes of one LED are each connected to a cathode of another LED, a voltage being applied to the two ends of the series thus resulting.

In the combined parallel/series circuit, also referred to as an LED matrix circuit, multiple series circuits of LEDs are connected to one another so that the individual LEDs of each series circuit are connected in parallel to individual LEDs of further series circuits. In the simple series circuit, a failure of one LED causes the further LEDs to remain dark. In contrast, if one of the LEDs fails in the combined parallel/series circuit, the current can still flow through the LEDs parallel to this failed LED. However, the problem presents itself that the operating conditions prevailing in the LED matrix circuit thus change. Therefore, further failures of LEDs can also occur, which are adjacent to the already defective LED, since these are now energized at a higher level by the changed operating conditions.

DE 10 2005 036 692 A1 discloses a lighting device for vehicles, in which particularly critical LEDs of the LED matrix circuit are activated separately. Special failure recognition sensors are assigned to the separate LEDs. In the event of failure of one LED in the LED matrix circuit, the LEDs located in parallel can still be loaded with a higher current. This results in a shorter lifetime of the adjacent LEDs. This effect is also referred to as the avalanche effect.

It is therefore at least one object to provide a lighting device in which reliable failure recognition is provided. In addition, other objects, desirable features and characteristics will become apparent from the subsequent summary and detailed description, and the appended claims, taken in conjunction with the accompanying drawings and this background.

SUMMARY

A lighting device for vehicle lights is proposed, which has a plurality of LEDs, which are arranged in a combined parallel/series circuit. In addition, the lighting device contains a first failure recognition detector to recognize the lighting of a first LED from a plurality of LEDs and a second failure recognition detector to recognize the lighting of a second LED from the plurality of LEDs. Using the failure recognition sensors, which are provided separately for the first LED and the second LED, the two LEDs can each be checked individually. It can therefore be recognized which of the LEDs has failed and whether an LED has failed at all.

If one of the LEDs of the LED matrix circuit fails, the current which flows through the entirety of the LEDs changes. This change of the current, in this case a decrease of the current, only contributes a small component to the current to the entire LED matrix circuit. Therefore, a very sensitive measuring structure for the overall current is required in order to recognize whether one of the LEDs has failed. However, it is to be noted that small temperature variations also already cause a change of the current. A recognition of failures of individual LEDs with the aid of a measuring device for the total current can therefore only be implemented with great difficulty. In contrast, the two failure sensors for the first and second LEDs can each recognize whether the LED assigned thereto still lights up. This allows very reliable failure monitoring for the LEDs of the LED matrix circuit.

In one embodiment, the first failure recognition detector is implemented as a first photodiode and the second failure recognition detector is implemented as a second photodiode. Photodiodes are distinguished by high sensitivity and typically only have two terminals, which means that the wiring outlay for these components is relatively small.

If the first photodiode has a sensor surface whose surface normal is aligned parallel to a propagation direction of the light of the first LED, and the second photodiode has a sensor surface whose surface normal is aligned parallel to a propagation direction of the light of the second LED, the two photodiodes are aligned with the respective LEDs in such a manner that they receive as much light as possible from this LED. The quantity of the light received from adjacent LEDs is thus reduced simultaneously.

In one embodiment, a grid having multiple grid cells is provided. The grid cells are separated from adjacent grid cells by light-opaque webs. The first LED of the plurality of LEDs and the first failure recognition sensor are provided in a first grid cell and the second LED of the plurality of LEDs and the second failure recognition sensor are provided in a second grid cell. The light-opaque webs ensure that the quantity of light which falls from one grid cell into another grid cell is as small as possible. It is therefore ensured that a photodiode does not receive an excessively large amount of scattered light from LEDs to which it is not assigned. In one embodiment, reflectors are provided in the respective grid cells. These increase the light yield of the lighting device.

The analysis circuit can be implemented as a microcontroller. A microcontroller allows a plurality of queries and controls, so that different reactions can occur depending on the failure picture of the LEDs in the combined parallel/series circuit. Therefore, depending on the failure picture, a warning can be output to the driver or stored in the diagnostic memory of the vehicle. In the event of more severe failures, such a warning can also be reinforced by a beep. It is also conceivable to partially activate further taillights if too many of the LEDs of the combined parallel/series circuit have failed. Alternatively to photodiodes, photocells can also be used as the failure detection sensors.

If the LEDs are arranged removably in the lighting device, in that they are plugged in, for example, the LEDs can be individually replaced if they have failed. The microcontroller or another activation circuit outputs which LED has failed. The corresponding LED can then be replaced in a repair shop.

In one embodiment, the first LED is activated with a pulse-width-modulated signal and the output signals of the first failure recognition sensor are queried synchronously to the pulse-width-modulated signal. It is thus ensured that the query only occurs if the LED also lights up or is supposed to light up. Such a lighting device is particularly suitable for taillights of a vehicle. It is difficult to recognize from the outside whether LEDs in an LED matrix circuit of a taillight are defective. The lighting device allows detection of the individual LEDs.

The application also relates to a vehicle having an above-mentioned lighting device, a display device being provided to display an error message if one of the analysis sensor detects that at least one of the LEDs of the plurality of LEDs is defective.

With the aid of the above-mentioned lighting device and the monitoring thus possible, each individual LED can be monitored independently of the circuit and therefore a more detailed fault code can be generated. In embodiments of the lighting concept, replacement of the defective part can therefore even be performed. A failure recognition is therefore generated, which optically detects a defect of an individual LED in an LED matrix circuit in taillights. The principle applies both to taillights and also for any other types of LED lights in the motor vehicle, which are interconnected in matrix form.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
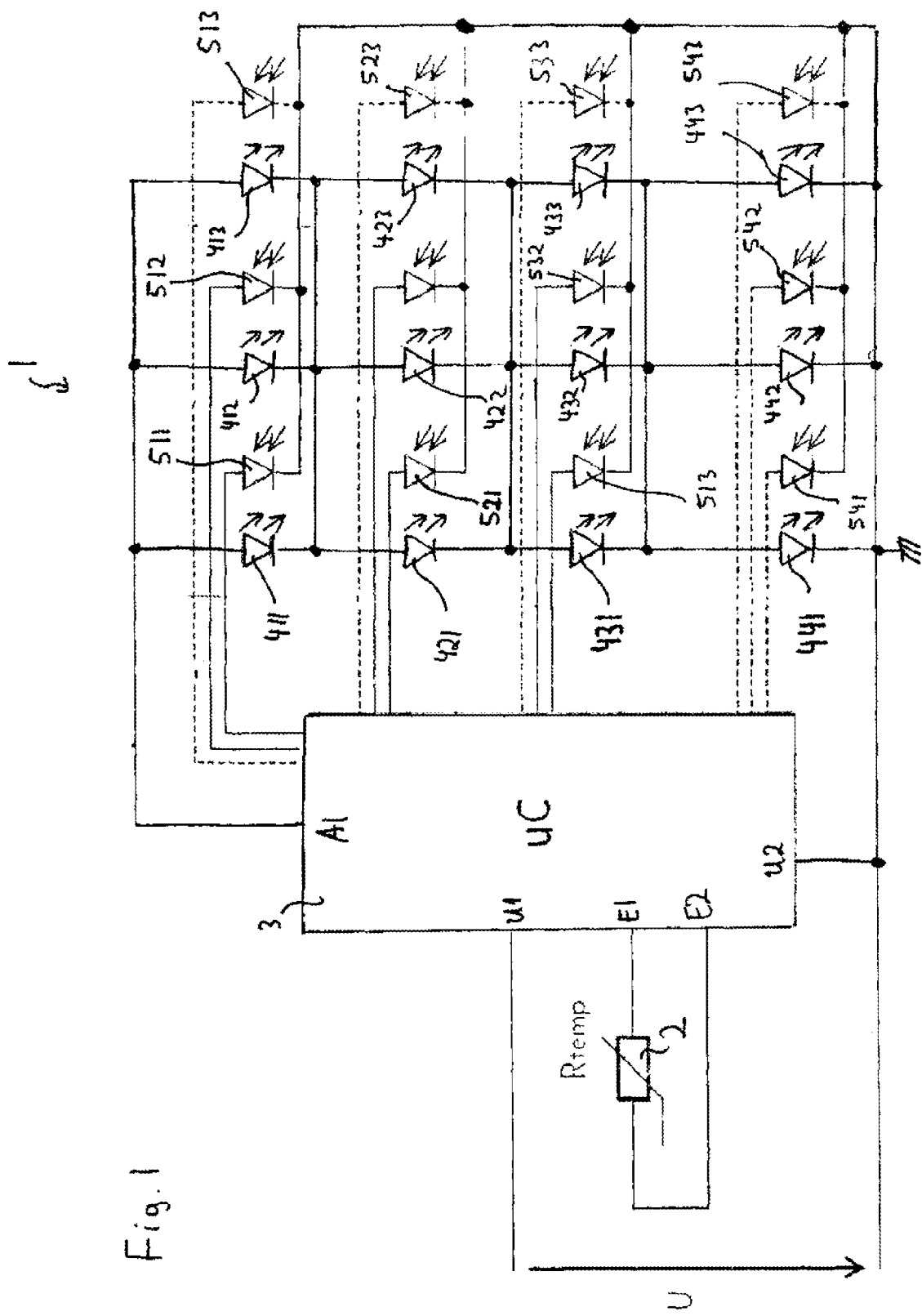
FIG. 1 shows the electrical circuit diagram of a lighting device.

FIG. 1 shows a circuit diagram of a lighting device of a vehicle in a first embodiment. The lighting device contains a microcontroller 3, a temperature-dependent resistor 2, and a plurality of LEDs 411 to 413, 421 to 423, 431 to 433, and 441 to 443. Furthermore, the lighting device 1 contains a plurality of photodiodes 511 to 513, 521 to 523, 531 to 533, 541 to 543. The microcontroller 3 receives an externally applied voltage U at two of its inputs U1 and U2. The temperature-dependent resistor 2 is connected using its terminals to the terminals E1 and E2 of the microcontroller 3.

The microcontroller 3 measures the current which flows through the terminals E1 and E2, which is a measure of the temperature. It outputs a pulse-width-modulated voltage, which is used to operate the plurality of LEDs, at its output A1 in accordance with the measured temperature. The voltage U is a supply voltage for the microcontroller 3.

The LEDs of the plurality of LEDs are connected in a combined parallel/series circuit. The diodes 411, 421, 431, and 441 are connected in series in such a manner that the cathode of the LED 411 is connected to the anode of the LED 421, whose cathode is connected to the anode 431. The cathode of the LED 431 is in turn connected to the anode of the LED 441. The cathode of the LED 441 is connected to ground, which is simultaneously connected to the input U2 of the microcontroller 3. In addition, two further series circuits of LEDs are provided. The cathodes of the LEDs 412, 422, 432 are each connected to the anode of the LEDs 422, 432, or 442, respectively, whereby a series circuit of the LEDs 412, 422, 423, and 442 results. The cathode of the LED 413 is connected to the anode of the LED 423, whose cathode is connected to the anode of the LED 443, the cathode of the LED 443 is connected to the anode of the LED 443. The anodes of the LEDs 412, 411, and 413 are connected to the terminal A1 of the microcontroller 3, while the cathodes of the LEDs 442 and 443 are connected to ground.

The parallel circuit of the combined parallel/series circuit is brought about in that LEDs which are at the same potential are connected in parallel. Thus, the cathodes of the LEDs 411, 412, and 413 are connected to one another. The cathodes of the LEDs 421, 422, and 423 are also connected to one another. The cathodes of the LEDs 431, 432, and 433 are also connected to one another. If one of the LED fails, for example, the LED 421, so that current can no longer flow through it, current can nonetheless still flow through the remaining LEDs, because current still flows through the parallel LEDs 422 and 423.

The photodiodes 511 to 543 are used as failure detectors for recognizing the lighting of a respective LED. Photodiode 511 is assigned to the LED 411, for example. LEDs and photodiodes which are assigned to one another have the same two end numbers. One photodiode is assigned to each one of the LEDs. The photodiodes are respectively connected to ground at their cathodes, while their anode leads to one of the input terminals of the microcontroller. The microcontroller therefore receives twelve input signals from the twelve photodiodes 512 to 543. The microcontroller measures the voltage at these photodiodes. If the voltage over one photodiode deviates strongly from an expected value, it is concluded therefrom that current does not flow through the corresponding photodiode. This means that the adjacent or assigned LED remains dark. The microcontroller 3 prepares a fault picture from this information. The driver is informed thereof if an LED is defective. If many LEDs are defective, this warning is assisted by a warning tone. Some conductor paths are shown by dashed lines in FIG. 1. This is only used for readability.

Figure 2:
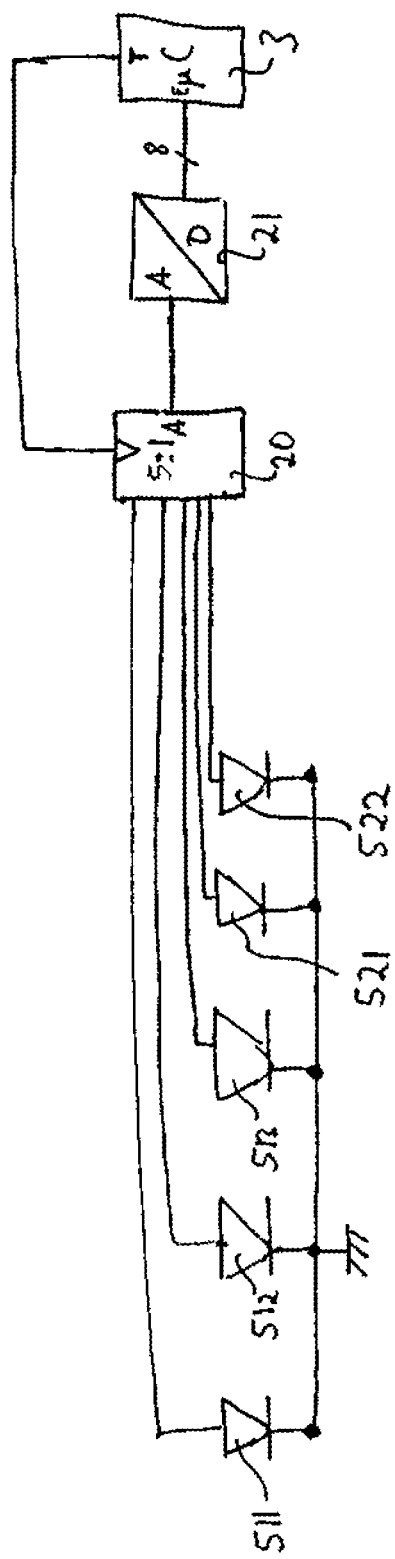
FIG. 2 shows details of an embodiment of the lighting device from FIG. 1.

FIG. 2 shows a circuit diagram of a detail of a further embodiment of a lighting device. In this lighting device, the signals from the photodiodes are not measured directly in the microcontroller, but rather are previously digitized. FIG. 2 shows five photodiodes 511, 512, 513, 521, and 522. It is obvious that more or fewer photodiodes can be provided. In addition, the circuit 2 shows a demultiplexer 20 and an analog-digital converter 21. In addition, FIG. 2 shows the microcontroller 3. The anodes of the photodiodes 511 to 522 are each connected to one input of the demultiplexer 20, while their cathodes are jointly connected to ground. The demultiplexer 20 is an analog demultiplexer. The demultiplexer 20 outputs a voltage at its output which corresponds to the voltage at precisely one input signal. The input voltage which corresponds to the output voltage is controlled by a clock, which the demultiplexer 20 receives at a clock input from a clock output of the microcontroller 3.

The output of the demultiplexer 20 is connected to the analog input of the analog-digital converter 21. This analog-digital converter 21 outputs a digital signal of 8-bit width at its output, which is output to the digital input E of the microcontroller 3. The voltages thus measured are processed further in the microcontroller 3. The circuit arrangement according to FIG. 2 has the advantage that the microcontroller 3 only requires a few analog inputs. It must be ensured that the demultiplexer 20 and the analog-digital converter 21 operate sufficiently rapidly to be able to measure the voltages at the photodiodes 511 to 522 and possibly further photodiodes in time multiplex.

Figure 3:
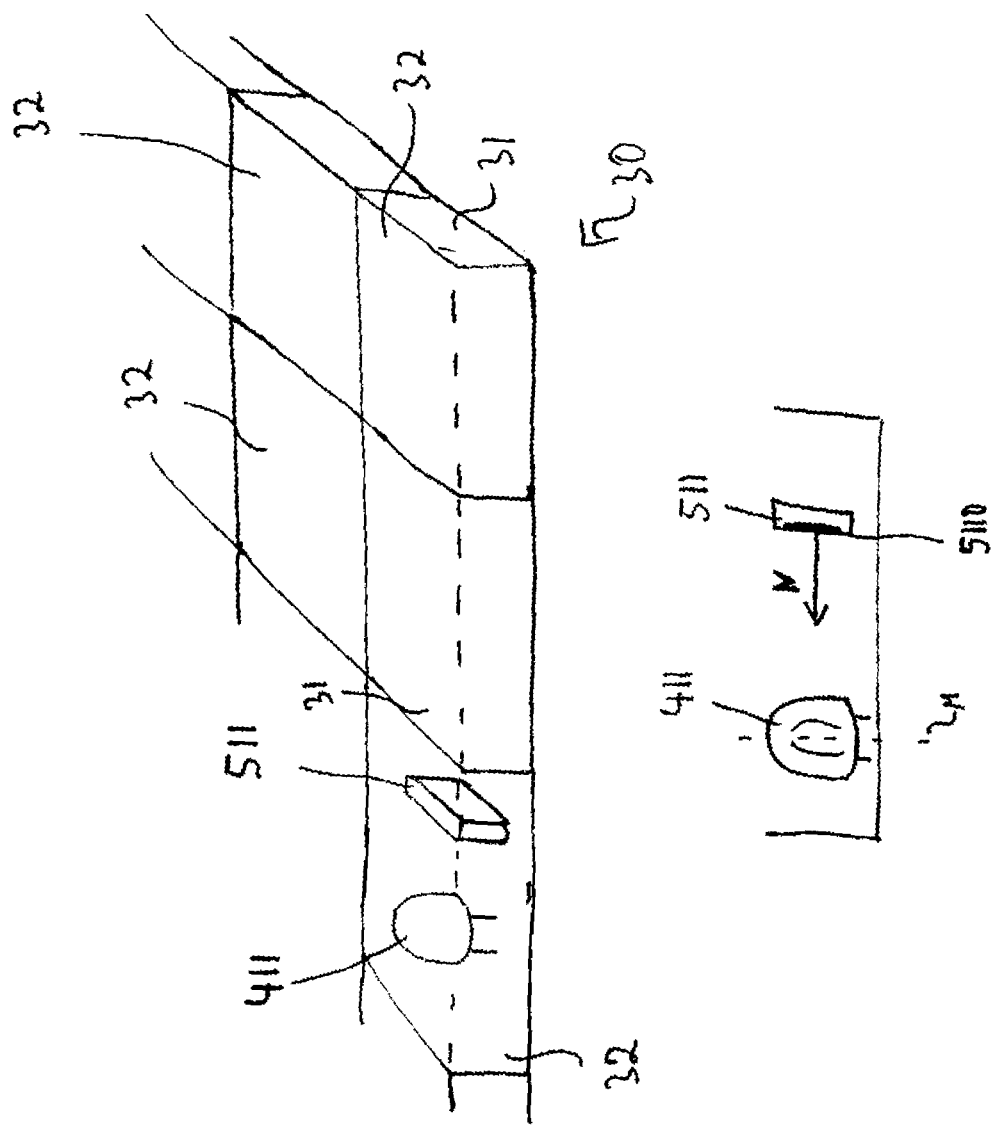
FIG. 3 shows a grid in which LEDs and failure recognition sensors of the lighting device are provided.

FIG. 3 shows a grid 30, which consists of a plurality of webs. The grid 30 is closed on the bottom and open on top. The grid 30 has a plurality of grid cells 32, which are each separated from one another by horizontal webs 31. An LED and a photodiode are provided in each grid cell 32. The LED 411 and the photodiode 511 are only shown in one of the grid cells 32 in FIG. 3. However, all grid cells 32 each actually contain one LED and one photodiode. Because LED and photodiode are each provided in one grid cell, the photodiode 511 receives relatively little scattered light from LEDs of adjacent grid cells 32. Reflectors, which reflect the light, are attached in each of the grid cells 32 to their bottom side and their webs 31. The light yield is thus increased.

A cross-section through the top of FIG. 3 is shown in the bottom of FIG. 3. The LED 411 has a central axis M. The LED 411 is shown on the bottom left and the photodiode 511 is shown on the bottom right in FIG. 3. The photoactive layer 5110 of the photodiode 511 is arranged on the left in the photodiode 511 and is therefore aligned with the LED 411. The surface normal N points in the direction of the LED 411 and intersects the central axis M. The LED 411 is arranged using a plug connection in the grid 30. The plug connection contains the electrical connection for the anode and the electrical connection for the cathode and also ensures the mechanical connection between the grid 30 and the LED 411. If it has been detected that the LED 411 is defective, it can be easily replaced with the aid of the plug connection.

Figure 4:
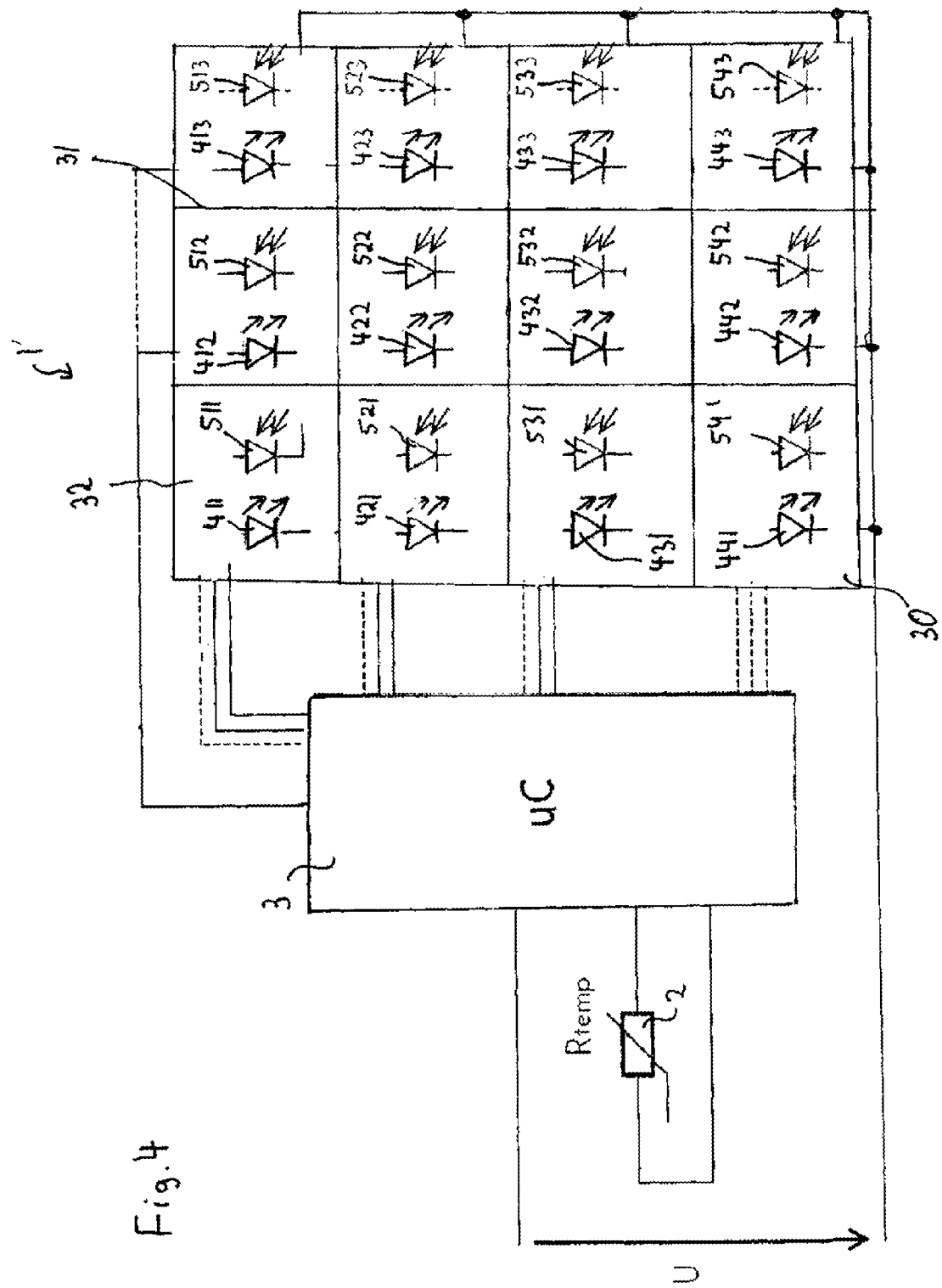
FIG. 4 shows an illustration of how LEDs and failure recognition sensors are arranged in the grid.
Figure 5:
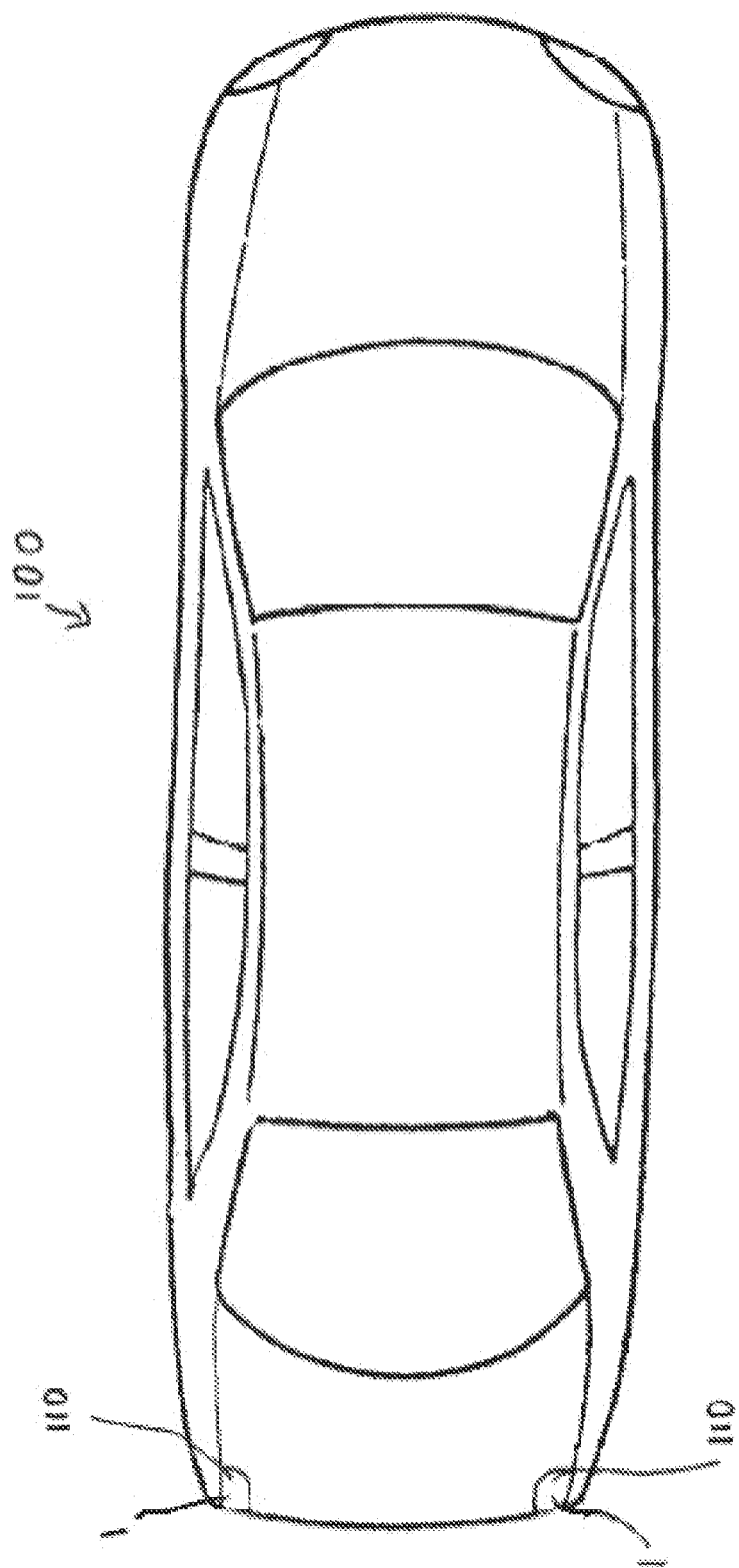
FIG. 5 shows a vehicle having a lighting device according to FIG. 1.

FIG. 4 shows the lighting device from FIG. 1, the grid 30 being schematically shown. The grid 30 has 12 grid cells 32. An LED and a photodiode assigned thereto are provided in each of the grid cells 32. The electrical terminals of the LEDs and photodiodes are not also shown in FIG. 4 for the sake of comprehensibility. FIG. 5 shows a vehicle 100 having a lighting device in the taillight 110, the lighting device being implemented according to the exemplary embodiment of FIG. 1.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

The invention claimed is:

1. A lighting device for vehicle lights, comprising:
   a plurality of LEDs arranged in a combined electrical circuit,
   a first failure recognition detector comprising a photodiode that has a sensor surface with a surface normal that points in the direction of the central axis of a first LED of the plurality of LEDs, the first failure recognition detector being configured to recognize the lighting of the first LED; and
   a second failure recognition detector comprising a photodiode that has a sensor surface with a surface normal that points in the direction of the central axis of a second LED of the plurality of LEDs, the second failure recognition detector being configured to recognize the lighting of the second LED.

2. The lighting device according to claim 1, further comprising a grid of a plurality of grid cells, the plurality of grid cells separated from adjacent grid cells by light-opaque webs,
   wherein the first LED of the plurality of the LEDs and the first failure recognition sensor are provided in a first grid cell and the second LED of the plurality of the LEDs and the second failure recognition sensor are provided in a second grid cell.

3. The lighting device according to claim 2, wherein the grid cells comprise reflectors.

4. The lighting device according to claim 1, wherein the failure recognition detector each comprise an output terminal configured to display the quantity of light, and the lighting device comprises a demultiplexer comprising at least two inputs and at least one output, the at least two inputs connected to the output terminals and the at least one output coupled to an analysis circuit.

5. The lighting device according to claim 4, wherein the analysis circuit is a microcontroller.

6. The lighting device according to claim 1, wherein the first LED and the second LED are removable from the lighting device.

7. The lighting device according to claim 1, wherein the first LED is configured for activation with a pulse-width-modulated signal and an output signal of the first failure recognition detector are queried synchronously with the pulse-width-modulated signal.

8. A vehicle, comprising:
   a lighting device, comprising:
   a plurality of LEDs arranged in a combined electrical circuit,
   a first failure recognition detector with a first photodiode comprising a sensor surface with a surface normal that points in the direction of the central axis of a first LED of the plurality of LEDs, the first failure recognition photo diode being configured to recognize the lighting of the first LED;
   a second failure recognition detector with a second photodiode comprising a sensor surface with a surface normal that points in the direction of the central axis of a second LED of the plurality of LEDs, the second failure recognition photo diode being configured to recognize the lighting of the second LED and,
   a display device configured to display an error message if one of the analysis sensors detects a faulty LED.

9. The vehicle according to claim 8, further comprising a grid of a plurality of grid cells, the plurality of grid cells separated from adjacent grid cells by light-opaque webs,
   wherein the first LED of the plurality of the LEDs and the first failure recognition detector are provided in a first grid cell and the second LED of the plurality of the LEDs and the second failure recognition detector are provided in a second grid cell.

10. The vehicle according to claim 9, wherein the grid cells comprise reflectors.

11. The vehicle according to claim 9, wherein the failure recognition sensors each comprise an output terminal configured to display the quantity of light, and the lighting device comprises a demultiplexer comprising at least two inputs and at least one output, the at least two inputs connected to the output terminals and the at least one output coupled to an analysis circuit.

12. The vehicle according to claim 11, wherein the analysis circuit is a microcontroller.

13. The lighting device according to claim 1, wherein the combined circuit is a parallel circuit.

14. The lighting device according to claim 1, wherein the combined circuit is a series circuit.

15. A lighting device for vehicle lights, comprising:
a plurality of LEDs arranged in a combined parallel/series electrical circuit, the first LED is configured for activation with a pulse-width-modulated signal and an output signal of the first failure recognition detector are queried synchronously with the pulse-width-modulated signal,
a first failure recognition detector configured to recognize the lighting of a first LED; and
a second failure recognition detector configured to recognize the lighting of a second LED of the plurality of LEDs.

\* \* \* \* \*